(12) United States Patent
Blumberg

(10) Patent No.: US 7,054,528 B2
(45) Date of Patent: May 30, 2006

(54) PLASMON-ENHANCED TAPERED OPTICAL FIBERS

(75) Inventor: Girsh Blumberg, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 22 days.

(21) Appl. No.: 10/824,245

(22) Filed: Apr. 14, 2004

(65) Prior Publication Data

US 2005/0232544 A1   Oct. 20, 2005

(51) Int. Cl.
G02B 6/26 (2006.01)
G02B 6/06 (2006.01)

(52) U.S. Cl. .................. 385/43; 385/117; 385/139
(58) Field of Classification Search .............. 385/42, 385/43, 117, 123–128, 139
See application file for complete search history.

(56) References Cited

U.S. PATENT DOCUMENTS

| | | | |
|---|---|---|---|
| 4,781,458 A | 11/1988 | Angel et al. | 356/301 |
| 5,789,742 A | 8/1998 | Wolff | 250/227.11 |
| 5,789,743 A | 8/1998 | Van Rosmalen | 250/234 |
| 5,866,430 A | 2/1999 | Grow | 436/172 |
| 5,908,562 A * | 6/1999 | Ohtsu et al. | 216/11 |
| 5,973,316 A | 10/1999 | Ebbesen et al. | 250/216 |
| 5,994,691 A | 11/1999 | Konada | 250/234 |
| 6,040,191 A | 3/2000 | Grow | 436/172 |
| 6,040,936 A | 3/2000 | Kim et al. | 359/245 |
| 6,052,238 A | 4/2000 | Ebbesen et al. | 359/738 |
| 6,063,898 A | 5/2000 | Endo et al. | 528/411 |
| 6,104,030 A * | 8/2000 | Chiba et al. | 250/306 |
| 6,236,033 B1 | 5/2001 | Ebbesen et al. | 250/216 |
| 6,236,783 B1 * | 5/2001 | Mononobe et al. | 385/43 |
| 6,285,020 B1 | 9/2001 | Kim et al. | 250/216 |
| 6,610,351 B1 | 8/2003 | Shchegolikhin et al. | 427/7 |
| 6,633,711 B1 * | 10/2003 | Pilevar et al. | 385/123 |
| 2002/0056816 A1 | 5/2002 | Stark | 250/493.1 |
| 2003/0036204 A1 | 2/2003 | Stark et al. | 436/172 |
| 2003/0179974 A1 * | 9/2003 | Estes et al. | 385/2 |

FOREIGN PATENT DOCUMENTS

| | | |
|---|---|---|
| WO | WO 01/52329 A1 | 7/2001 |
| WO | WO 02/095070 A2 | 11/2002 |
| WO | WO 03/019245 A2 | 3/2003 |

OTHER PUBLICATIONS

"Learn NSOM" published online at www.Nanonics.co.il by Nanonics Imaging Ltd. prior to Apr. 12, 2004 (4 pages).
"NSOM System Comparisons" published online at www.Nanonics.com.il by Nanonics Imaging Ltd. prior to Apr. 12, 2004 (11 pages).

* cited by examiner

*Primary Examiner*—John D. Lee
*Assistant Examiner*—Tina M. Wong
(74) *Attorney, Agent, or Firm*—John F. McCabe

(57) ABSTRACT

An apparatus includes an optical fiber and an electrically conducting layer. The optical fiber has a tapered portion with a lateral surface and an end face. The electrically conducting layer is located on a portion of the lateral surface of the tapered portion. The tapered portion and electrically conducting layer are configured to generate surface plasmons that propagate along a surface of the conducting layer in response to light of a preselected wavelength arriving at an end of the tapered portion.

22 Claims, 7 Drawing Sheets

PLASMON-ENHANCED TAPERED OPTICAL FIBERS

BACKGROUND

1. Field of the Invention

This invention relates to optical fibers with tapered tips, methods and systems that use such optical fibers, and methods of fabricating such optical fibers.

2. Discussion of the Related Art

Many near-field scanning optical microscopes (NSOMs) use an optical fiber to laterally scan the sample being imaged. The optical fiber has an end face that either collects image light from a region of the sample or delivers illumination light to a region of the sample. To increase lateral resolution, some NSOMs incorporate a scanning optical fiber whose tip has been gradually but substantially down-tapered. The down tapering produces an end face whose diameter is much smaller than the diameter of the untapered portion of the optical fiber. Decreasing the diameter of an end face has a tendency to reduce the lateral range in the sample from which light will be collected. For that reason, a NSOM whose scanning optical fiber has a down-tapered tip potentially has a higher lateral scanning resolution than another NSOM that is similar except for the down-tapering of the tip of the scanning optical fiber.

Down-tapering a tip of a scanning optical fiber increases light losses in the optical fiber for two reasons. First, the down-tapering produces a smaller end face, which is less efficient at collecting light than a larger end face. If the end face's diameter, d, is much smaller than the wavelength, $\lambda$, of the light collection efficiency is expected to scale with "d" as a positive power of $d/\lambda$, e.g., $(d/\lambda)^4$. Second, down-tapering a single mode optical fiber typically causes light to leak out of the down-tapered portion of the optical fiber.

For both of the above-described reasons, optical fibers with down-tapered tips typically have lower light collection efficiencies than optical fibers that are similar except for the down-tapering. The lower light collection efficiency will lower the sensitivity of a NSOM whose scanning optical fiber has such a down-tapered tip. Thus, increasing a NSOM's lateral resolution by tapering-down the tip of the scanning optical fiber often involves a tradeoff of lower sensitivity for the NSOM.

SUMMARY

Various embodiments provide for optical fiber devices that include an optical fiber with a tapered portion. The tapered portion includes structures that provide for surface plasmon enhanced light transport in the optical fiber. The enhanced light transport increases the optical coupling between a free end face of a down-tapered portion of the optical fiber and the remainder of the optical fiber.

One embodiment features an apparatus that includes an optical fiber and an electrically conducting layer. The optical fiber has a tapered portion with a lateral surface and an end face. The electrically conducting layer is located on a portion of the lateral surface of the tapered portion. The tapered portion and electrically conducting layer are configured to generate surface plasmons that propagate along a surface of the conducting layer in response to light of a preselected wavelength arriving at an end of the tapered portion.

Another embodiment features an apparatus that includes an optical fiber and a metal layer. The optical fiber has a tapered portion and an untapered portion. The tapered portion has an end face. The untapered portion has a larger diameter than the end face. The metal layer is located on a lateral surface of the tapered portion. A surface of the metal layer includes an array of structures that are substantially regularly spaced along a portion of the length of the tapered portion.

Some embodiments of the above apparatus include a near-field scanning optical microscope (NSOM). The NSOM includes a mechanical scanner and one of the above-described optical fibers and conducting layers. The mechanical scanner is capable of mechanically scanning the end face of said fiber across a sample.

Another embodiment features a method for fabricating an optical fiber device. The method includes providing an optical fiber having a portion with a tapered diameter. The portion with the tapered diameter has a central axis and a lateral surface. The method includes forming a metal film on the lateral surface of the tapered portion such that one surface of the metal film has an array of structures that are regularly spaced structures along a central axis of the tapered portion.

Another embodiment features a method for transporting light. The method includes receiving light at an end of an optical fiber, converting a portion of the light into surface plasmons, and reconverting a portion of the surface plasmons into output light at a second end of the optical fiber. The converting step is such that the surface plasmons propagate along the length of a portion of the optical fiber.

BRIEF DESCRIPTION OF THE DRAWINGS

In the Figures and text, the same reference numerals are used to indicate features with similar functions.

In the Figures, some feature dimensions may be relatively magnified and/or reduced to better illustrate the features.

The illustrative embodiments are described more fully with reference to the accompanying figures and detailed description. The inventions may, however, be embodied in various forms and are not limited to embodiments described herein.

DETAILED DESCRIPTION OF ILLUSTRATIVE EMBODIMENTS

Figure 1A:
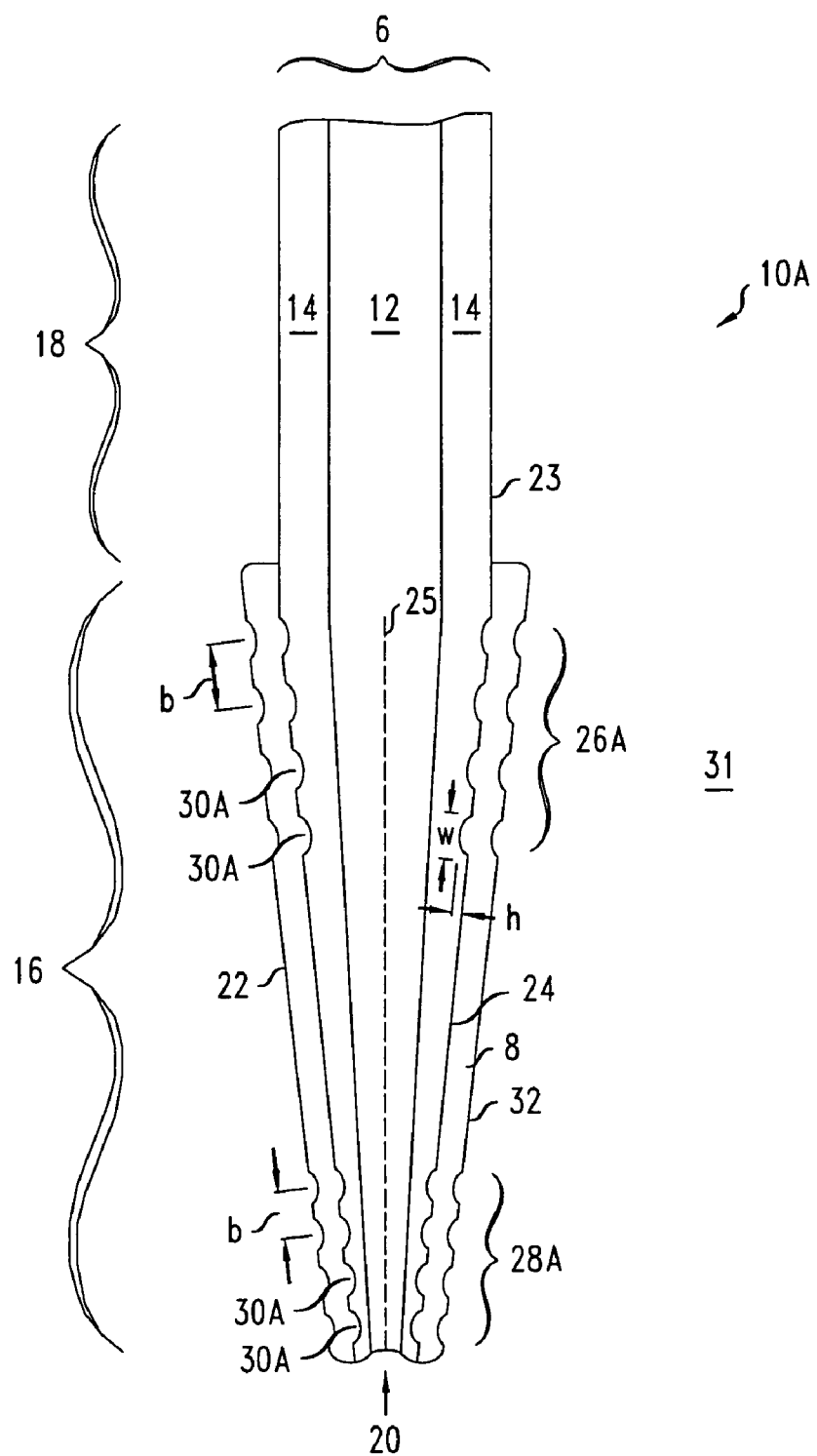
FIGS. 1A, 1B, and 1C are cross-sectional views of first, second, and third embodiments of optical fiber devices for collecting or delivering light.

FIG. 1A shows a longitudinal portion of optical fiber device 10A. The optical fiber device 10A includes a silica glass optical fiber 6 and an electrically conducting layer 8 located on the outer lateral surface 23, 24 of the optical fiber 6. The optical fiber 6 includes an optical core 12 and an optical cladding 14. In some embodiments (not shown), the optical fiber 6 may be unclad, i.e., only having an optical core. The optical fiber 6 has an untapered portion 18 and a tapered portion 16. The tapered portion 16 gradually reduces the diameter of the untapered portion 18 to the smaller diameter of end face 20. The electrically conducting layer 8 covers part or all of the length of lateral surface 24 of the tapered portion 16 and may cover a portion of lateral surface 23 of untapered portion 18. The conducting layer 8 extends over a portion of or the entire circumference of the tapered portion 16, e.g., half of the circumference. Exemplary electrically conducting layers 8 are formed of metals such as gold, silver, and/or platinum.

Conducting layer 8 includes one or more arrays 26A, 28A of structures 30A. The structures 30A are located at the interface between electrically conducting layer 8 and optical fiber 6. Portions of the one or more arrays 28A, 26A are located near opposite ends of tapered portion 16 of the optical fiber 6. The array 26A may be located on the tapered portion 16, the untapered portion 18 or both the tapered and untapered portions 16, 18. The array 28A is located near end face 20. The structures 30A in the arrays 26A, 28A have a substantially equal spacing, b, along central axis 25 of the tapered portion 16.

The structures 30A are bumps on an inner surface of electrically conducting layer 8. The bumps are in one-to-one correspondence with pits or dimples that are located on outer lateral surface 23, 24 of the optical fiber 6. Different ones of the structures 30A typically have substantially similar cross sections, i.e., the same local cross-sectional shape, height from surface 24, and width along central axis 25. Different ones of the structures 30A have diameters that vary with the diameter of the tapered portion 16. Exemplary structures 30A include pit-like rings encircling ½ or more of the circumference of the tapered portion 16 and may encircle the entire circumference of the tapered portion 16. Exemplary structures 30A also include simple circular holes spaced along lines running along the length of the tapered portion 16. Exemplary cross-sections of the structures 30A have heights, h, and/or widths, w, which are in the range $[0.1\lambda, \lambda]$ or are about $0.3\lambda$. Here, $\lambda$ is a wavelength that untapered portion 18 of the optical fiber 6 is configured to transport, e.g., a telecommunications wavelength for standard single-mode optical fiber. The substantially similar shapes of the structures 30A and the equal neighbor spacings between the structures 30A cause arrays 26A, 28A to have the forms of gratings.

In other embodiments (not shown), the arrays 26A and 28A are replaced by a single array of structures 30A. In the single array, the structures 30A are regularly spaced along central axis 25. The single array extends along substantially the entire length of the tapered portion 16.

In optical fiber device 10A, tapered portion 16 enables end face 20 to have a substantially smaller diameter than the untapered portion 18. In some embodiments where the untapered portion 18 is a standard, single-mode, telecom, optical fiber, exemplary end faces 20 may have diameters in the range of about 50 nm–400 nm. Due to the small diameter of the end face 20, the optical fiber device 10A is able to collect light from a sample and/or deliver light to a sample with an improved lateral resolution, i.e., lateral to the central axis 25 of the tapered section 16.

Ordinarily, the improved lateral resolution could have a downside. In particular, the diameter reduction in tapered portion 16 will cause substantial light losses if untapered portion 18 is a standard single mode telecom optical fiber, i.e., a narrow optical fiber. At telecom wavelengths, light can leak out of the narrower tapered portion 16. In optical fiber device 10A, such optical losses are reduced, because optical energy is transferred to surface plasmons, which propagate through the optically lossy, tapered portion 16. Surface plasmons do not suffer from the same types of losses as light in the tapered portion 16. Thus, converting light into surface plasmons reduces losses that could otherwise be caused by the non-ideal "light" propagation conditions in the tapered portion 16.

Figure 1B:
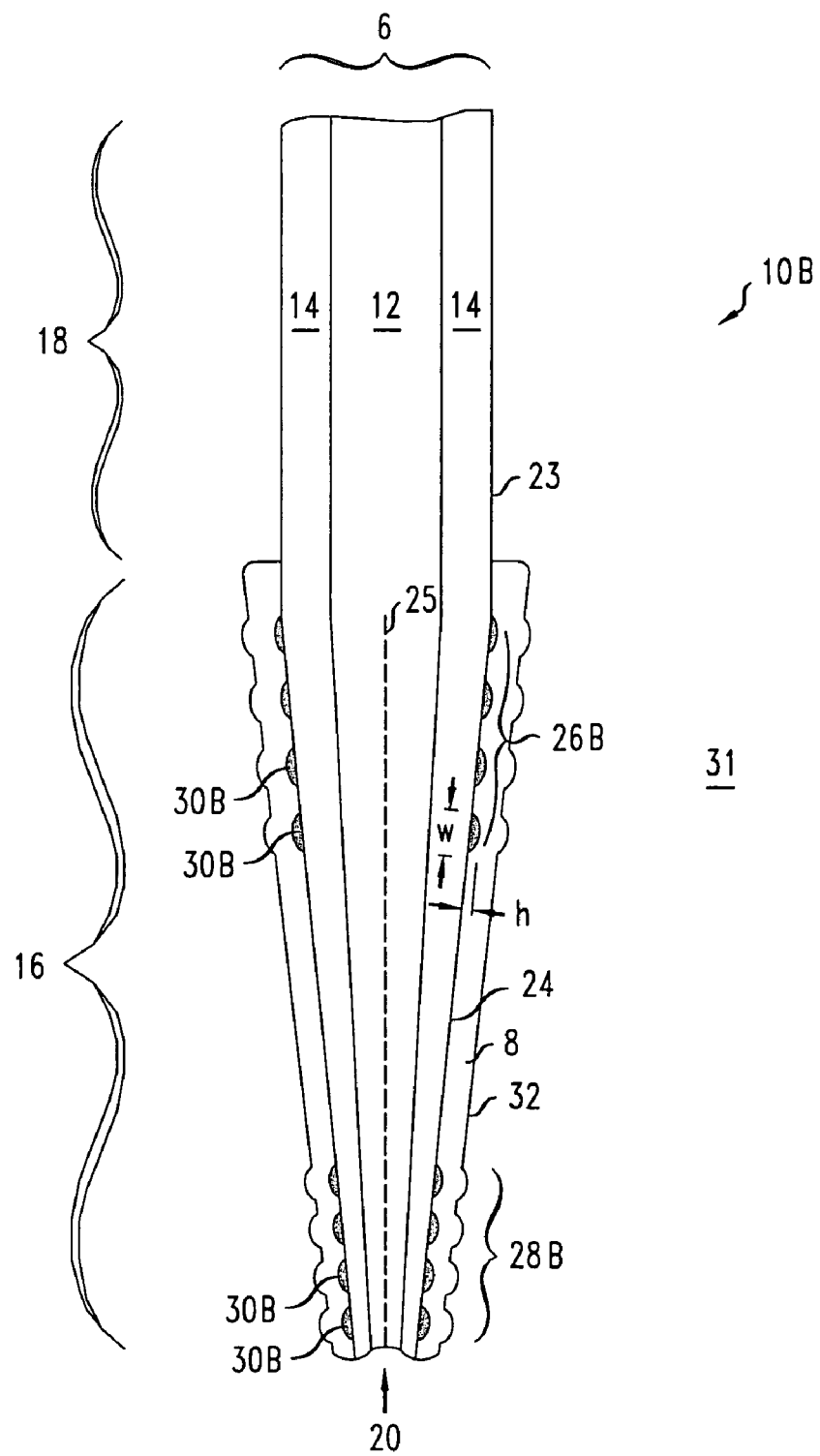
Figure 1C:
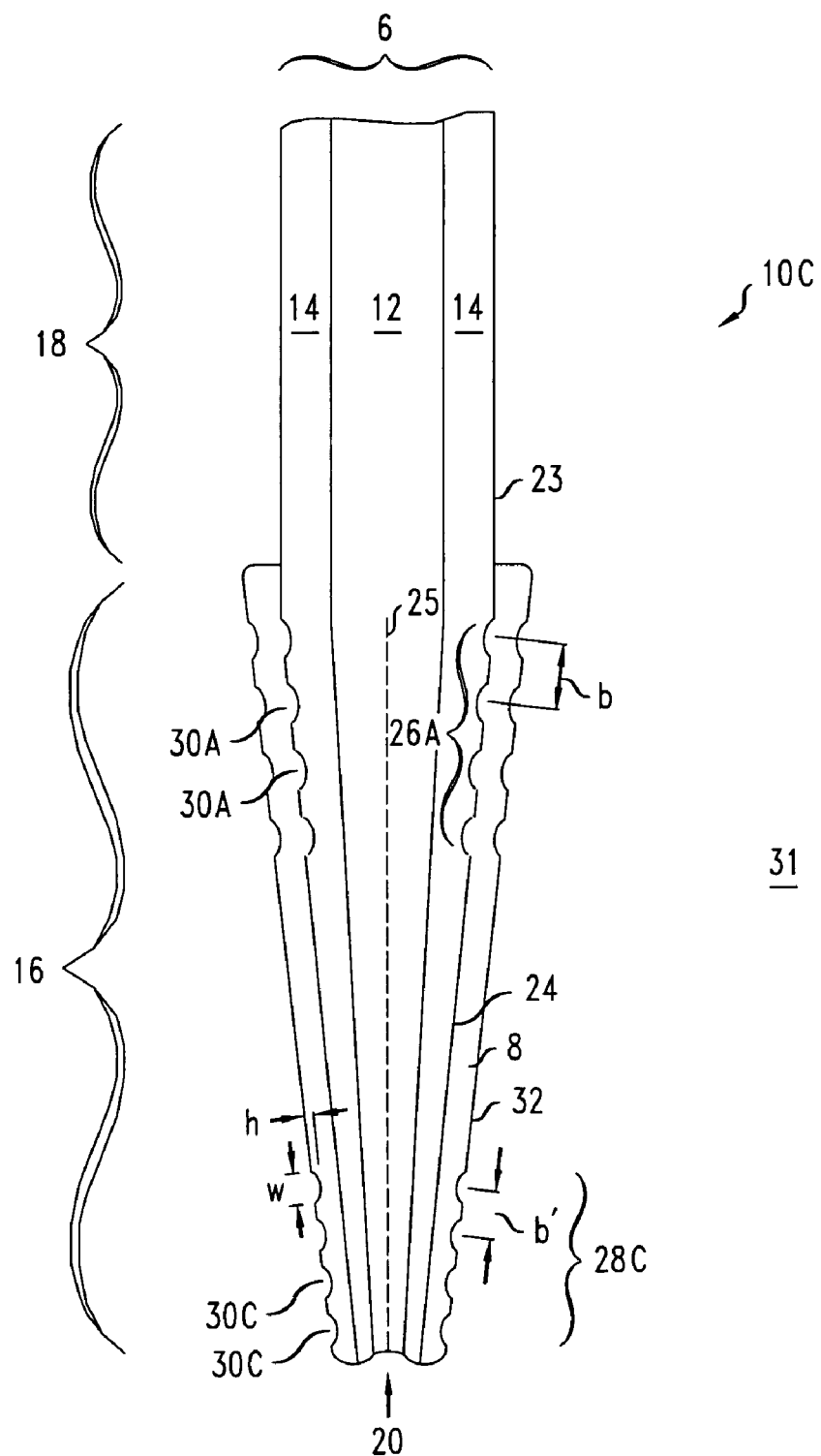

FIGS. 1B and 1C show alternate embodiments of optical fiber devices 10B, 10C, which operate similarly to optical fiber device 10A of FIG. 1A.

FIG. 1B shows an optical fiber device 10B that includes optical fiber 6 and electrically conducting layer 8. The optical fiber 6 has tapered and untapered portions 16, 18 as described with respect to optical fiber device 10A of FIG. 1A. Optical fiber device 10B includes arrays 26B, 28B of structures 30B. In the arrays 26B, 28B, the structures 30B are regularly spaced along central axis 25 of the tapered portion 16. The structures 30B are produced by ring-shaped bumps of a non-conducting material rather than by bumps of the conducting layer 8 itself as shown in FIG. 1A. The structures 30B have similar shapes and sizes, but have diameters that are proportional to the diameter of the tapered portion 16 of the optical fiber 6. The material of the bumps has a different dielectric constant than the silica glass of the tapered portion 16. For example, the bumps may be formed of a dielectric such as silicon nitride or of a semiconductor such as amorphous or polycrystalline silicon rather than the silica glass of the optical fiber 6. The bumps produce periodic variations in the dielectric constant in arrays 26B, 28B thereby forming grating-like structures along the tapered portion 16. Exemplary cross-sections of the structures 30B have heights, h, and/or widths, w, which are in the range $[0.1\lambda, \lambda]$ or are about $0.3\lambda$. Here, $\lambda$ is a wavelength that untapered portion 18 of the optical fiber 6 is configured to transport, e.g., a telecommunications wavelength for standard single-mode optical fiber.

FIG. 1C shows an optical fiber device 10C that also includes optical fiber 6 and electrically conducting layer 8. The optical fiber 6 has tapered and untapered portions 16, 18 as already described with respect to optical fiber devices 10A, 10B of FIGS. 1A–1B. Optical fiber device 10C has an array 26A, 28C of structures 30A, 30C near ends of the tapered portion 16, i.e., untapered portion 18 and end face 20. The array 26A is located at the interface between the optical fiber 6 and conducting layer 8 and has already been described with respect to the optical fiber device 10A. The array 28C is located at the interface between electrically conducting layer 8 and the external ambient material, i.e., gas or vacuum 31. The structures 30C of the array 28C are ring-like pits in the outer surface 32 of the electrically conducting layer 8. The array 28C is at the interface 24 between the material of the conducting layer 8 and ambient gas or vacuum 31. The structures 30C have similar or identical shapes, heights, h, and widths, w, but have diameters that are proportional to the diameter of the tapered portion 16. Exemplary cross-sections of the structures 30C have heights, h, and/or widths, w, which are often in the range $[0.1\lambda, \lambda]$ or are about $0.3\lambda$. Here, $\lambda$ is a wavelength that untapered portion 18 of the optical fiber 6 is configured to transport. In the arrays 26A, 28C, the structures 30A and the structures 30C are regularly spaced along central axis 25. The spacing, b, between adjacent ones of the structures 30A and the spacing, b', between adjacent ones of the structures 30C are typically different, i.e., typically $b \neq b'$.

Figure 1D:
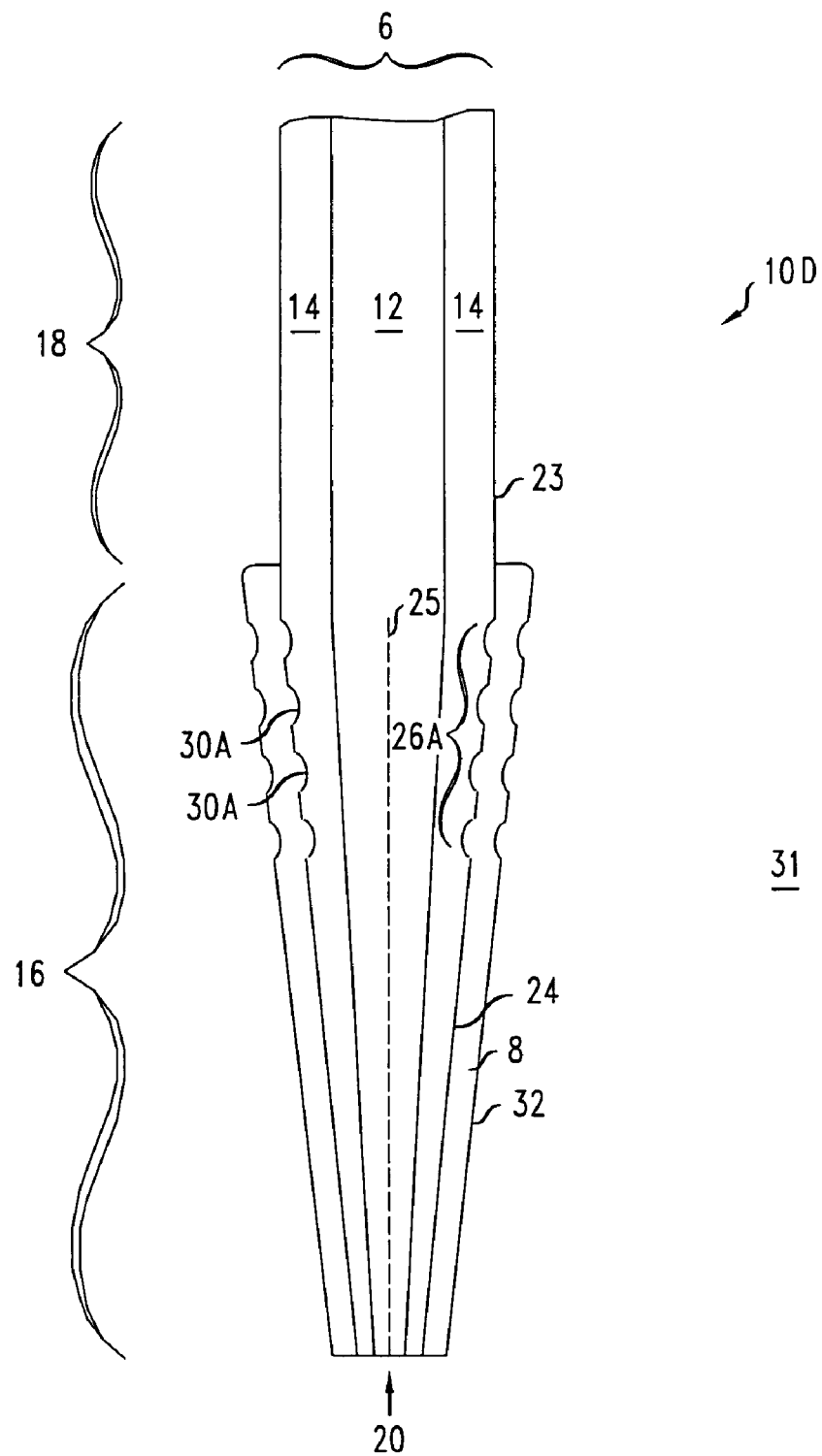
FIG. 1D is a cross-sectional view of an embodiment of optical fiber device for delivering illumination light.

FIG. 1D shows an optical fiber device 10D that is the same as optical fiber device 10C of FIG. 1C except for the absence of array 28C and structures 30C near end face 20.

In the optical fiber device 10D, light of a selected wavelength generates surface plasmons in the array 26A, and the surface plasmons propagate on the surface 24 along the axis of tapered portion 16.

Figure 2:
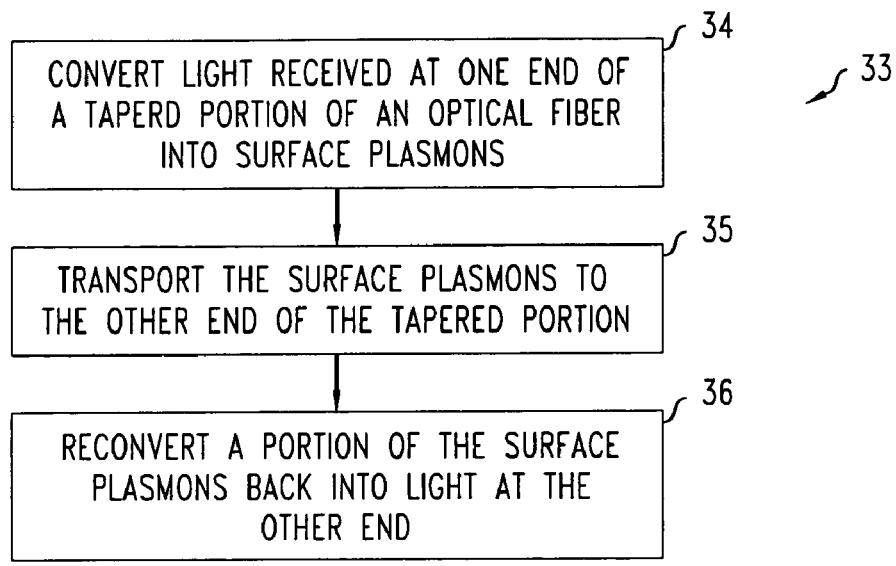
FIG. 2 is a flow chart illustrating how the optical fiber devices of FIGS. 1A–1C transport light.

FIG. 2 illustrates a method 33 of transporting light through optical fiber devices 10A–10C of FIGS. 1A–1C.

The method 33 includes converting a portion of light into surface plasmons in response to receiving the light near a first end of tapered portion 16 (step 34). This conversion occurs in an array of structures that are located near the first end at the interface 24, 32 between conducting layer 8 and a dielectric. The conversion occurs in array 28A–28C when the optical fiber device 10A–10C collects light from end face 20 and occurs in array 26A, 26B when the optical fiber device 10A delivers illumination light received from untapered portion 18. The array, which causes the conversion, is at the interface 24 between the conducting layer 8 and the optical fiber 6 or on the interface 32 between the conducting layer 8 and ambient gas/vacuum 31. In the converting array, a constant spacing, b, between nearest-neighbor structures 30A–30C determines the selected wavelength of light that the fiber optical device 10A–1C converts into surface plasmons.

The method 33 includes causing the surface plasmons to propagate from the first end of the tapered portion 16 to the second end of the tapered portion 16 (step 35). The tapered portion 16 includes a conductor-dielectric interface that supports the propagation of surface plasmons between the ends of the tapered portion 16. The interface 24, 32 is between conducting layer 8 and optical fiber 6 or between conducting layer 8 and ambient air or vacuum 31. Since the surface plasmons and not light carry a substantial part of the energy between the two ends of the tapered portion 16, "optical" losses are reduced in the tapered portion 16, i.e., losses due to a small diameter of the tapered portion 16 are reduced.

The method 33 includes reconverting surface plasmons into light near the second end of the tapered portion 16 (step 36). The second end includes a regular array of structures, e.g., structures 30A–30C, adapted to reconverting arriving surface plasmons back into light. This second conversion occurs in arrays 26A, 26B when the optical fiber devices 10A–10C collect light at end face 20 and in arrays 28A–28C when the optical fiber devices 10A–10C deliver illumination light to the end faces 20.

In optical fiber devices 10A–10C, periodic arrays 26A–26B, 28A–28C facilitate the conversions between light and surface plasmons and vice versa. These conversions are constrained by energy and momentum conservation requirements.

Figure 3:
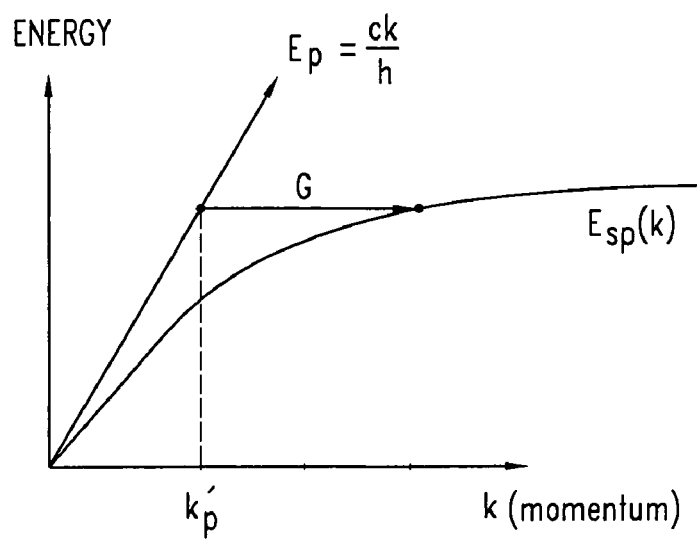
FIG. 3 shows illustrative dispersion relations for photons and surface plasmons.

FIG. 3 shows dispersion relations for the photon energy, $E_p(k_p)$, and the surface plasmon energy, $E_{sp}(k_{sp})$, in terms of the photon momentum, $k_p$, and surface plasmon momentum, $k_{sp}$. Here, $E_p = ck_p/n$ and $k_{sp} = \omega/c \sqrt{\epsilon_m(\omega) \cdot \epsilon_d / (\epsilon_m(\omega) + \epsilon_d)}$ where "n" is the refractive index, $\omega = E_{sp}(k_{sp})/h$, $\epsilon_m(\omega)$ is the dielectric constant of conducting layer 8, and $\epsilon_d$ is the dielectric constant of the adjacent dielectric.

Conversion of a photon into a surface plasmon and vice versa is constrained by energy and momentum conservation. On a translational invariant interface, such conversions do not occur, because energy and momentum cannot be simultaneously conserved, i.e., $E_p(k) \neq E_{sp}(k)$. On an interface having a 1-dimensional periodic array of structures, e.g., arrays 26A–26B, 28A–28C, momentum is only conserved up to a reciprocal lattice vector. Thus, the condition for energy conservation becomes the generalized energy conservation condition: $E_p(k) = E_{sp}(k+NG)$ where reciprocal lattice vector, G, satisfies $G = 2\pi/b$. Here, b is the spacing between structures of the array, e.g., structures 30A–30C, and N is any integer. These modified energy and momentum conservation relations enable inter-conversions of photons and surface plasmons at selected photon momentum, $k_p'$, i.e., selected wavelengths. The values of the selected momenta depend on the spacing, b, of objects in the arrays, i.e., via G, and on the refractive index and dielectric constants via the photon and surface plasmon dispersion relations. From the above-described relations and the values of dielectric constants and refractive indexes of the materials involved, one of skill in the art would be able to determine the spacing, b, which produces conversions between photons and surface plasmons in the arrays 28A–28C, 26A–26B.

Referring again to FIG. 10C, optical fiber device 10C has two features that aid in conversions between light propagating in optical fiber 6 and surface plasmons propagating along outer lateral surface 32. First, conducting layer 8 is thin enough that surface plasmons propagating on external lateral surface 32 couple strongly to light in the optical fiber 6. Typically, the conducting layer 8 is thinner than the skin depth at the selected wavelength for the light that generates surface plasmons in array 26A. Due to the thinness of the conducing layer 9, light, which propagates in the optical fiber 6, couples strongly to surface plasmons that propagate on the external lateral surface 32. Second, the spacing, b, between adjacent structures 30A of array 26A is selected to ensure energy conservation for converting surface plasmons on the outer lateral surface 32 into photons propagating in the optical fiber 6. Since the dispersion relations for photons and surface plasmons are different on the two sides of conducting layer 8, the requirement of energy conservation typically may dictate that values for the spacing b in the array 26A be different from the spacing b' between adjacent structures 30C of array 26C. The spacing b enables energy conservation in a conversion between a photon propagating outside of the optical fiber 6 and a surface plasmon propagating along the outer lateral surface 32, i.e., at an interface between conducting layer 8 and air or vacuum 31.

Figure 4:
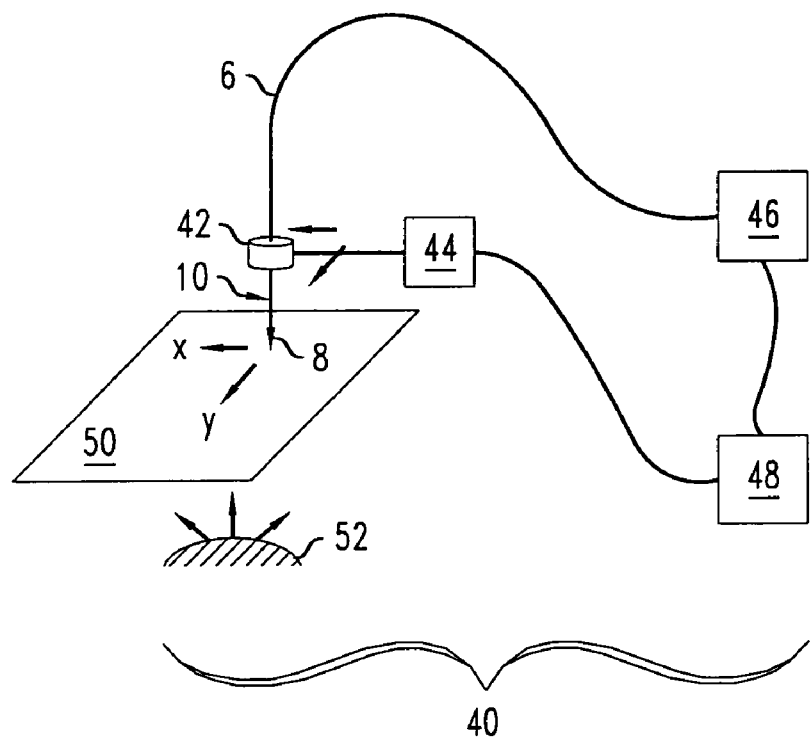
FIG. 4 shows a near-field scanning fiber optical microscope (NSOM) that incorporates one of the optical fiber devices of FIGS. 1A–1D.

FIG. 4 shows a near-field scanning fiber optical microscope (NSOM) 40. The NSOM 40 includes scanning optical fiber 6, conducting layer 8, a fiber-tip holder 42, an electromechanical scanner 44, an optical intensity detector 46, and a computer 48. The scanning optical fiber 6 has a tapered tip portion that is partially or entirely coated by the conducting layer 8 to form optical fiber device 10, e.g., as shown device 10A, 10B, or 10C of FIG. 1A, 1B, or 1C. The electromechanical scanner 44 scans the tapered tip portion of the scanning optical fiber 6 in x-direction and/or y-direction scan patterns along a surface 50 of a sample while the sample is being illuminated by source 52. The scanning optical fiber 6 collects light refracted by the sample. The optical intensity detector 46 measures the intensity of light received from the scanning optical fiber 6 and transmits data representative of the intensity measurements to the computer 48. The computer 48 uses data on the intensity measurements from the optical intensity detector 46 and x and y position data from the electro-mechanical scanner 44 to produce a scanned image of the sample.

The NSOM 40 has an optical sensitivity that is enhanced the light transport properties of the tapered tip portion of scanning optical fiber device 10. In particular, surface plasmons enhance transport of light through the tapered tip portion of the optical fiber device 10 as described above for the exemplary optical fiber devices 10A–10C of FIGS. 1A–1C.

Figure 5A:
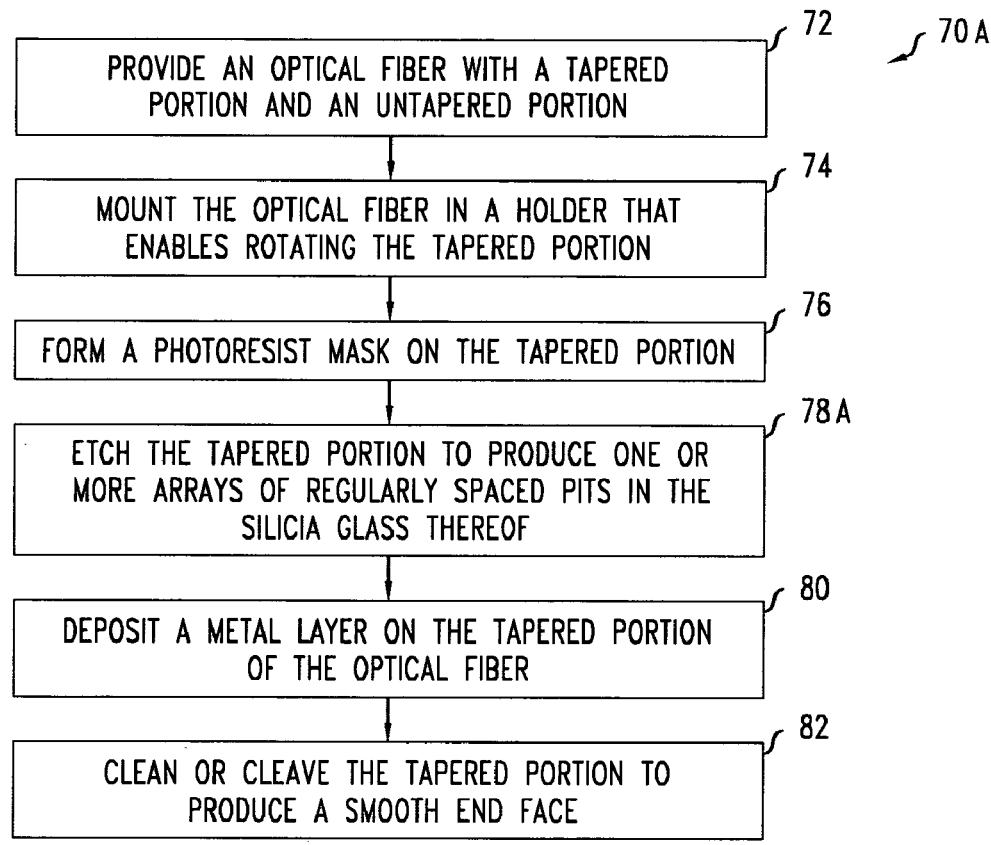
FIG. 5A is a flow chart for a method of fabricating an optical fiber device, e.g., the device of FIG. 1A.

FIG. 5A illustrates a method 70A for fabricating optical fiber devices, e.g., optical fiber device 10A of FIG. 1A.

The method 70A includes providing an optical fiber with a tapered portion and an untapered portion, e.g., optical fiber 6 (step 72). The tapered portion may be a central segment of the optical fiber or a tip segment of the optical fiber. The optical fiber may be fabricated by heating a portion of a standard optical fiber, pulling the heated portion, and then, cooling the pulled portion. The pulled portion may be cleaved to form an end face thereon. The optical fiber may be obtained commercially, e.g., as a bare NSOM optical fiber probes from Nanonics Imaging Ltd., Manhat Technology Park, Malcha, Jerusalem ISRAEL 91487 (www.nanonics.co.il).

The method 70A includes mounting the optical fiber in a holder (step 74). The holder exposes and enables rotations of the tapered portion of the optical fiber about its central axis. During subsequent treatment steps it is convenient to rotate the tapered portion to enable fabrication of structures that encircle said portion.

The method 70A includes forming a photoresist mask on the tapered portion of the optical fiber (step 76). Forming the photoresist mask includes applying mask material to the tapered portion, exposing regions of the mask material with an e-beam, and developing the mask material to produce windows therein. The windows go around the circumference of the tapered portion, because the holder rotates the tapered portion of the optical fiber during the e-beam exposure.

The method 70A includes performing a mask-controlled etch of the tapered portion of the optical fiber with an etchant selective for silica glass (step 78A). Exemplary etchants include gaseous HF and solutions of HF. The etching step is timed to produce pits in the surface of the tapered-tip portion, e.g., the pits associated with arrays 26A and 26B. After the etching step a conventional process removes the mask material, e.g., a plasma strip.

Next, the method 70A includes depositing a conducting layer on the tapered portion of the optical fiber, e.g., conducting layer 8 (step 80). Exemplary depositing steps include evaporation-depositions of metals such as gold, silver, or platinum. The deposition forms a conducting layer with arrays of regularly spaced structures that correspond to the previously-etched pits, e.g., layer 8 with arrays 26A, 28A.

The method 70A also includes forming a smooth end face on the tapered portion of the optical fiber (step 82). The forming step includes either cleaving the tapered portion or cleaning the conducting material from an end surface of the tapered portion. After the forming step, the end face is free of the conducting material. The end face is located adjacent an array formed during the etching step.

Figure 5B:
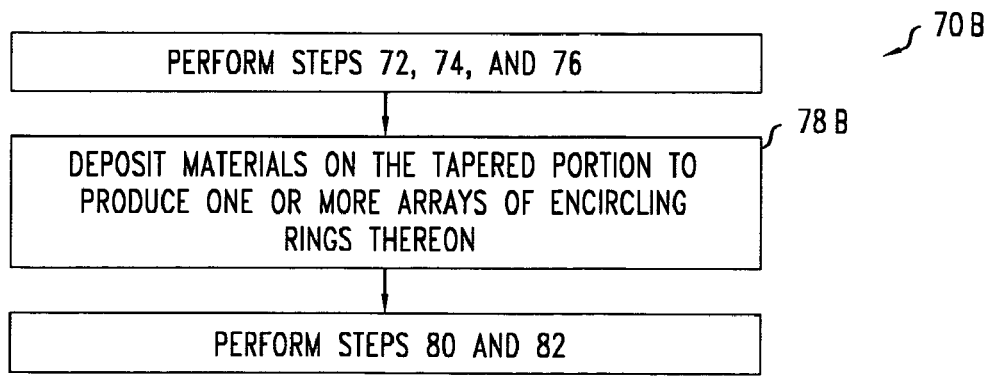
FIG. 5B is a flow chart for a method of fabricating an alternate optical fiber device, e.g., the device of FIG. 1B.

FIG. 5B illustrates a method 70B for fabricating an alternate optical fiber device, e.g., optical fiber device 10B of FIG. 1B.

The method 70B includes performing steps 72, 74, and 76 as described with respect to above method 70A. The method 70B includes performing a mask-controlled deposition of material on the tapered-tip portion of the optical fiber to produce one or more arrays of encircling rings of material on the tapered portion, e.g., arrays 26B, 28B (step 78B). Exemplary deposition materials include dielectrics such as silicon nitride and semiconductors such as amorphous or polycrystalline silicon. The depositing step produces ring-shaped bumps of material that are regularly spaced along the axis of the tapered portion, e.g., structures 30B. The material of the bumps have a dielectric constant significantly different than the dielectric constant of the silica-glass optical fiber 6. After depositing the material, remaining mask material is removed as described in above step 78A. The method 70B also includes performing steps 80 and 82 as described with respect to method 70A.

Other embodiments of the invention will be apparent to those skilled in the art in light of the specification, drawings, and claims of this application.

What we claim is:

1. An apparatus, comprising:
   an optical fiber having a tapered portion with a lateral surface and an end face;
   an electrically conducting layer located on a portion of a lateral surface of the tapered portion of the optical fiber; and
   wherein the tapered portion and electrically conducting layer are configured to generate surface plasmons that propagate along a surface of the conducting layer in response to light of a preselected wavelength arriving at an end of the tapered portion; and
   wherein an interface between said optical fiber and the electrically conducting layer comprises an array of structures configured to convert a portion of said surface plasmons into light that propagates out of a second end of the tapered portion.

2. The apparatus of claim 1, wherein the structures have a regular spacing along a central axis of said tapered portion.

3. The apparatus of claim 2, wherein each structure comprises a bump of material of the conducting layer, a hole in the conducting layer, or a bump of material with a dielectric constant differing from the dielectric constant at adjacent portions of the optical fiber.

4. The apparatus of claim 2, wherein a cross section of each structure has a height of $\lambda$ or more from the interface and a width of $\lambda$ or more along the interface, wherein $\lambda$ is a wavelength of light that an untapered portion of the optical fiber is adapted to carry.

5. An apparatus, comprising:
   an optical fiber having a tapered portion with a lateral surface and an end face;
   an electrically conducting layer located on a portion of a lateral surface of the tapered portion of the optical fiber; and
   wherein the tapered portion and electrically conducting layer are configured to generate surface plasmons that propagate along a surface of the conducting layer in response to light of a preselected wavelength arriving at an end of the tapered portion; and
   wherein the conducting layer comprises an array of structures located near a first end of the tapered portion and is configured to convert a portion of said received light into said surface plasmons.

6. The apparatus of claim 5, wherein the conducting layer comprises another array of structures located near a second end of the tapered portion and is configured to convert a portion of said surface plasmons into light that propagates out of the second end of the tapered portion.

7. The apparatus of claim 1, wherein the conductive layer is a metal layer.

8. The apparatus of claim 1, further comprising a scanning optical microscope; and
   wherein the microscope comprises a mechanical scanner and the optical fiber, the mechanical scanner being capable of mechanical moving the end face of said fiber across a sample.

9. An apparatus, comprising:
an optical fiber having a tapered end portion and an untapered portion, the tapered end portion having an end face, the untapered portion having a larger diameter than the end face;
a metal layer located on a lateral surface of the tapered end portion; and
wherein a surface of the metal layer has an array of structures that are substantially regularly spacing along a portion of the length of the tapered end portion.

10. The apparatus of claim 9, wherein the array is adjacent the end face and the metal layer has a second array of regularly spaced structures located near the untapered portion.

11. The apparatus of claim 9, wherein, at least, some of the structures form rings around more than ½ of the circumference of the fiber.

12. The apparatus of claim 9, wherein at least some of the structures are located along an interface between the tapered portion and the metal layer.

13. The apparatus of claim 9, wherein at least some of the structures are located along an external surface of the metal layer, the metal layer being between said external surface and the tapered portion of the optical fiber.

14. The apparatus of claim 9, wherein the structures are one of pits on a surface of the metal layer, holes in the metal layer, and bumps on a surface of the metal layer.

15. The apparatus of claim 9, further comprising a scanning optical microscope; and
wherein the microscope comprises a mechanical scanner and the optical fiber, the mechanical scanner being capable of mechanical moving the end face of said fiber across a sample.

16. The apparatus of claim 9, wherein each structure comprises a bump of material of the metal layer, a hole in the metal layer, or a bump of material with a dielectric constant differing from the dielectric constant at adjacent portions of the optical fiber.

17. The apparatus of claim 9, wherein a cross section of each structure has a height of $0.1\lambda$ or more from the surface of the metal layer and a width of $0.1\lambda$ or more from the surface of the metal layer, wherein $\lambda$ is a wavelength of light that an untapered portion of the optical fiber is adapted to carry.

18. A method of fabricating an optical fiber device, comprising:
providing an optical fiber having a portion with a tapered diameter, the portion having a central axis and a lateral surface; and
forming a metal film on the lateral surface of the tapered portion such that one surface of the metal film has an array of structures, the structures being regularly spaced along a central axis of the tapered portion.

19. The method of claim 18, further comprising performing a mask-controlled etch or a mask-controlled deposition to produce second structures on said lateral surface of the tapered portion, the second structures being regularly spaced along a portion of the length of said lateral surface.

20. The method of claim 19, further comprising then, forming a clean end face on a segment of said tapered portion, an array of said structures being located adjacent said end face.

21. A method of transporting light, comprising:
receiving light at one end of an optical fiber;
converting a portion of the received light into surface plasmons such that the surface plasmons propagate along the length of a portion of the optical fiber; and
reconverting a portion of the surface plasmons into output light at a second end of the optical fiber; and
wherein the converting produces surface plasmons that propagate along a surface of a metal layer that covers a lateral surface of the optical fiber; and
wherein the converting includes producing the surface plasmons in a first regular array of structures on said surface and the reconverting includes producing the output light in a second regular array of structures on a surface of said metal layer.

22. The method of claim 21, wherein the optical fiber is tapered and the receiving comprises receiving said light at an end face of the optical fiber or receiving said light from an untapered portion of optical fiber.

* * * * *